March 9, 1954 L. C. LICHTY 2,671,314
GAS TURBINE AND METHOD OF OPERATION THEREFOR
Filed Jan. 26, 1950 2 Sheets-Sheet 2
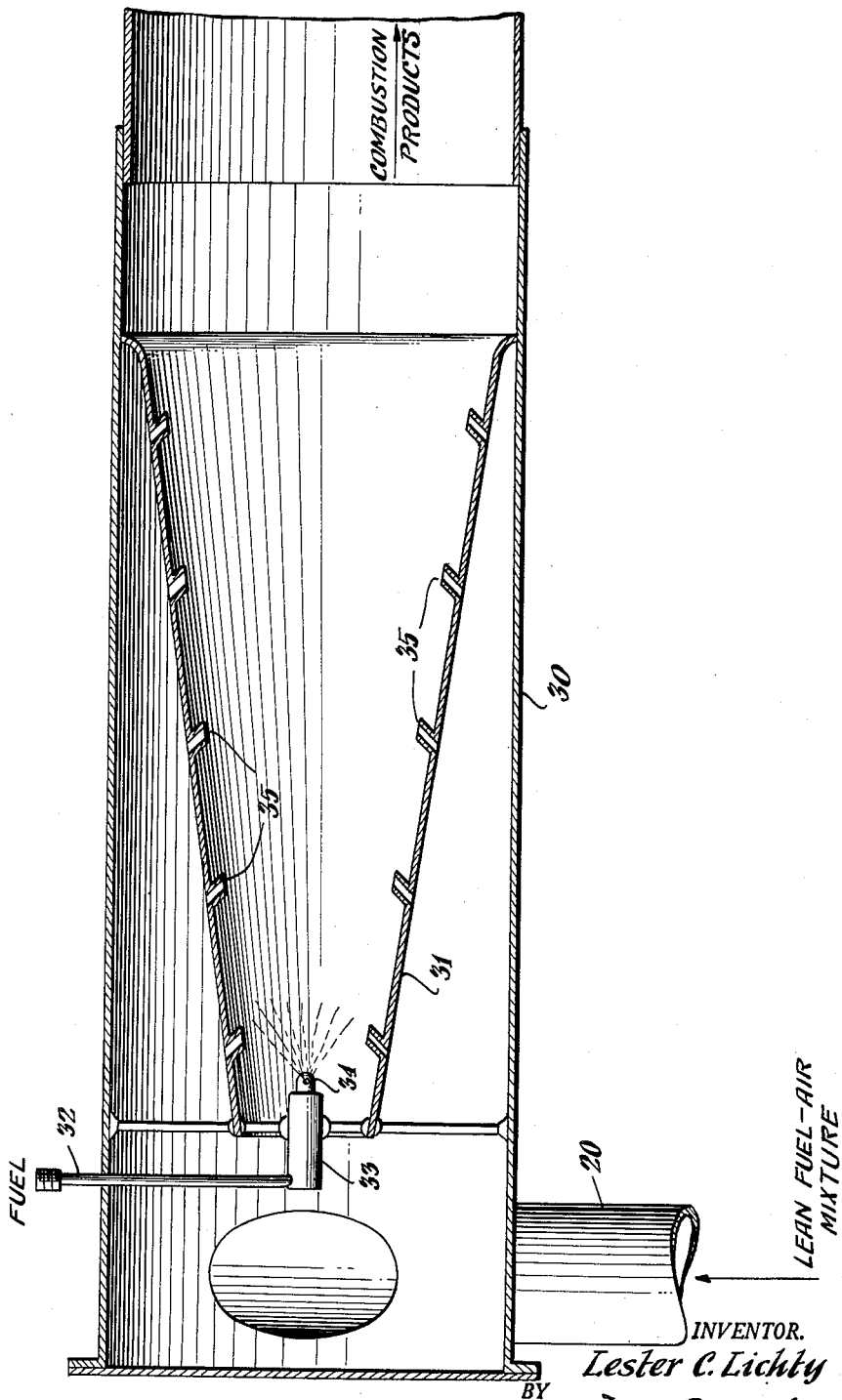
INVENTOR.
Lester C. Lichty
BY
AGENT OR ATTORNEY Patented Mar. 9, 1954

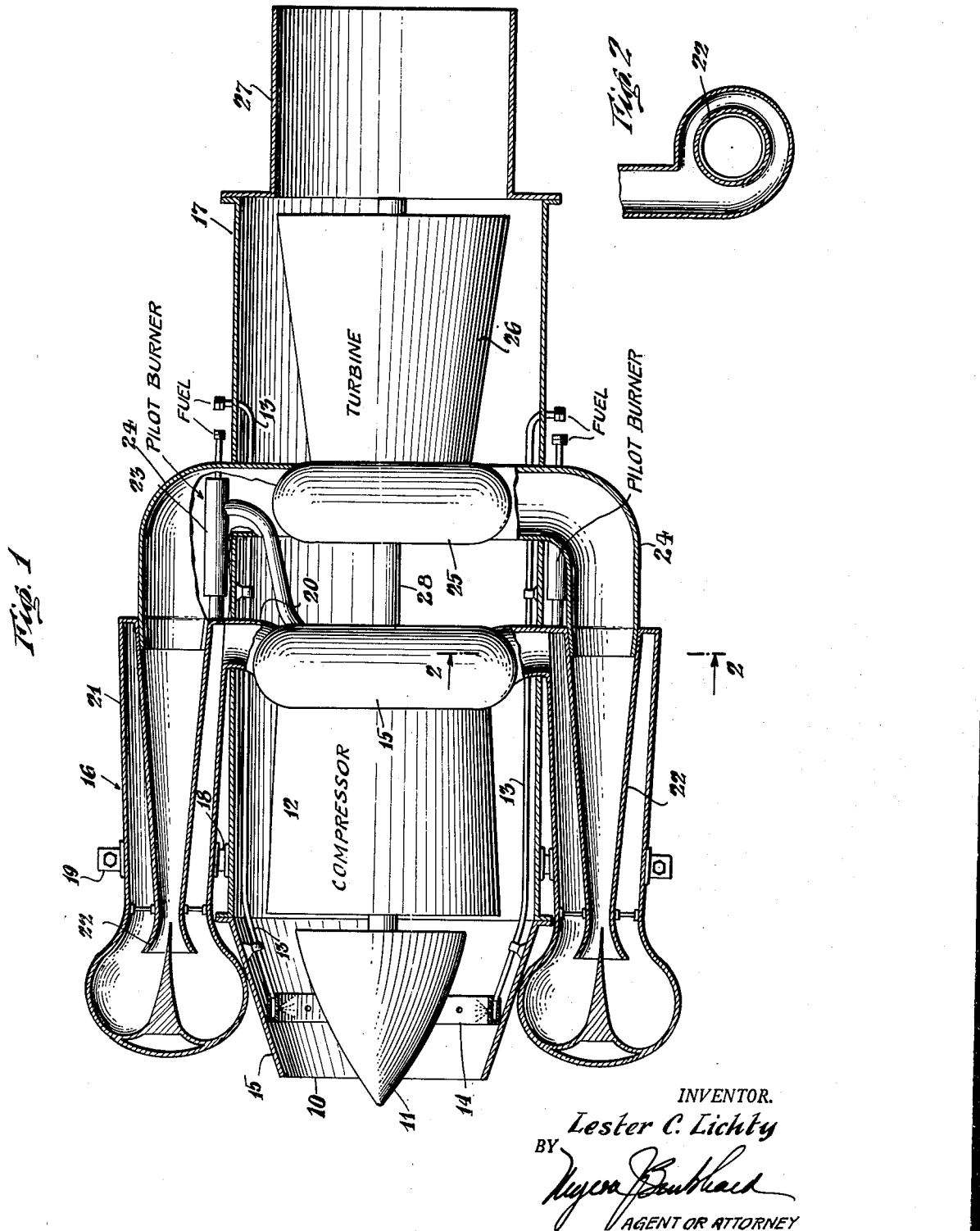

2,671,314

UNITED STATES PATENT OFFICE 2,671,314

GAS TURBINE AND METHOD OF OPERATION THEREFOR

Lester C. Lichty, New Haven, Conn., assignor to Socony-Vacuum Oil Company, Incorporated, a corporation of New York Application January 26, 1950, Serial No. 140,678

6 Claims. (Cl. 60—39.02)

1

This application is directed to gas turbine plants which use a compressor to supply compressed air to a burner, a burner to burn liquid fuel mixed with air in vaporized form, and a turbine to extract from the exhaust gases at least sufficient power to drive the compressor.

In recent years jet propulsion units or gas turbine plants have been produced and used successfully for commercial purposes, particularly in the aircraft field. The prior art shows units, principally, which compress the air in a rotary compressor and introduce the compressed air into a burner. The air is split into two streams; one being mixed with the fuel which is sprayed therein in nearly chemically correct proportions to burn in the combustor, the other being used as a cooling medium to surround the combustor and intermix with the hot combustion products, thereby preventing the overheating of the metallic elements. The products of combustion are then passed through a turbine, usually mounted on a common shaft with the compressor, and thereafter discharged from the plant. All or most of the power may be taken through the turbine, or the thrust of the discharging gas may be utilized as propulsive force, as in the jet propulsion units. This invention applies broadly to all devices of this general type, and is not limited to the particular units illustrated herein.

The compression of gas, such as air, results in a heating effect on the gas. If the heat is removed during compression, the work of compression is reduced and an improvement in compressor efficiency would be obtained.

In the combustors of the prior art the fuel is sprayed into the air stream and rapidly burned. There is little opportunity for adequate mixing of the fuel and air. The combustion products are subsequently mixed with excess air under conditions which make uniform mixing difficult to obtain.

It is an object of this invention to improve gas turbine operation by improving the compressor efficiency. It is a further object of this invention to improve the mixing of fuel with air in a gas turbine plant. It is a further object of this invention to improve the efficiency of combustion in a gas turbine plant.

It is a further object of this invention, as an overall effect of these improvements, to increase the gas turbine plant output.

These and other objects will be made apparent by the following description of the invention, made with reference to the attached sketches, in which;

2

Figure 1 is a diagrammatic showing of a gas turbine plant incorporating the improved features of this invention, and in which;

Figure 2 is a cross-sectional view of the burner, shown on Figure 1, and taken at the section 2—2, and in which;

Figure 3 is a sectional view of an alternate type of combustor applicable to the instant invention.

Referring to Figure 1, air is taken in through the aperture 10, and directed by the deflector 11 to the compressor 12. The compressor may be of the centrifugal or axial flow type. Liquid fuel, from a supply not shown, is pumped through the conduits 13, 13, to the manifold ring 14 located in the nose housing 15. A series of inwardly directed orifices in the housing are located at equally spaced intervals around the interior of the ring 14, and serve to spray the fuel, in atomized form, into the incoming air stream. The atomized fuel and air is mixed during passage through the compressor, the turbulence being sufficient to effect uniform mixing of the air and fuel. During the passage through the compressor, as the air is heated by compression, the droplets of fuel in atomized form convert to vapor or gas with a consequent extraction of heat from the compressed air. This results in greatly improved compressor performance.

The fuel-air mixture is withdrawn from the compressor into a collector housing 15, and thence fed to the combustors 16, located about the periphery of the main housing 17. The combustors are attached to the housing 17 by means of the pedestals 18 and clamps 19. The feed conduits 20 are adapted to introduce the gases into the outer tube 21 in a radial direction, thereby setting up a swirling motion in the annulus between the inner tube 22 and the outer tube 21. The design of the inner and outer tubes of the combustor is such that the velocity of the gases through the combustor is substantially constant, except for in the region of the throat of the inner tube 22. The mixture of fuel and air is withdrawn through the inner tube 22. The mixture is heated during its passage through the annulus and reaches reaction temperature in the inner tube 22 liberating the available energy with high combustion efficiency. This type of combustor is necessary to effect reaction of the fuel-air mixture which may be on the order of 30 to 50 parts of air to 1 part of fuel by weight. These ratios at normal temperature are non-combustible, but by means of the regenerative heating effected by the combustor shown, reaction is effected, releasing energy with high efficiency. It is necessary, because of the lean mixtures involved, that the surfaces of each combustor be heated prior to the starting of the unit. This is accomplished by burning fuel in a pilot burner 23, discharging the hot products of combustion into the combustor 16. After the combustors reach operating temperatures, at which the reaction of the lean mixtures is effected, the pilot burners are extinguished.

Referring to Figure 1, the burner design is such that the reaction takes place, primarily, in and near the entrance to the burner or inner tube 22. As the compressed lean mixture flows through the annulus between the inner and outer tubes, it absorbs heat from the inner tube up to the point where the reaction begins in the inner tube. Since the temperature of the compressed lean mixture is rising the cross-sectional area of the annulus between the inner and outer tubes increases gradually in the direction of gas flow in order to maintain the highest pressure.

The rounded or knob-shaped end of the burner is streamlining to prevent pressure drop also. The tip of the streamlining end penetrates the well-rounded entrance of the inner tube, eliminating a throat which would cause a pressure drop, and thereby, preventing an increase in velocity before reaction occurs. If this tip is not used there will be a throat located at the entrance to the inner tube, with a consequent increase in gas velocity at that point.

The reaction occurs over some length of the inner tube and in order to prevent increase in velocity and corresponding pressure drop, the inner tube is designed with a gradual increase in area in the direction of gas flow.

The hot gases, withdrawn from the combustor 16 through the conduits 24, are introduced into the manifold ring 25 and passed through the blading of the turbine 26. The exhaust from the turbine 26 is discharged through the tail pipe 27. The turbine 26 and compressor 12 are mounted on the common shaft 28, whereby sufficient power to drive the compressor is extracted from the gases by the turbine.

It is not absolutely essential that the mixture of gases passing through the annulus surrounding the inner pipe 22 have a swirling motion. Such a motion is preferred however, and may be obtained by a radially attached conduit 20, as shown in detail in Figure 2. The swirling motion aids in mixing the fuel and air more uniformly and brings the mixture in contact with the entire surface of the inner wall.

Referring now to Figure 3, an alternate design of combustor is shown which gives results equivalent to the regenerative type combustor previously described and may be substituted therefor. In this design the lean air-fuel mixture is introduced through the conduit 20 tangentially into the closed end of the combustor tube 30. The conical inner tube 31 is situated adjacent the incoming stream of gases such that the major portion of the gases swirls around the inner tube 31, contacting the hot wall. Fuel is introduced through the conduit 32, from a source not shown, into the injector 33 and discharged from the nozzle 34 in the form of a fine spray. This fuel mixes with a small portion of the lean fuel-air charge which passes through the opening in the end of the inner tube 31, forming a substantially chemically correct mixture. This mixture is burned continuously in the inner tube, providing heat for the heating of the tube wall. The hot, lean fuel-air mixture, which swirls about the outside of the inner tube, enters tube through the orifices 35 located about the periphery of the inner tube and at spaced points along the tube. Within the tube the lean fuel-air mixture mingles with the combustion products of the previously described combustion, and reaction is effected with an efficient release of the energy contained therein. The combustion products are discharged from the open end of the outer tube 30 to the turbine, as previously disclosed in the discussion of the regenerative type burner.

It is clear that the embodiment shown in Figure 3 does not require a pilot burner, inasmuch as the combustor is equipped to burn a portion of the air at substantially chemically correct proportion for combustion. This combustor has the added feature that it is not normally disturbed by short interruptions in the main fuel lines, as long as fuel is fed continually to the combustor. The combustion in the inner tube acts to keep the combustor in operation during periods of interrupted flow, maintaining the temperatures in the combustor at operating temperatures.

Although the invention has been disclosed with specific reference to jet propulsion devices, it is not intended that the invention be limited thereto. The description, with reference to this particular device, was merely by way of illustration of the invention. The only limitations intended are those found in the following claims.

What is claimed is:

1. The method of operating a turbine set including a compressor, turbine and at least one combustor which comprises spraying liquid fuel into the air prior to its introduction into the compressor in a ratio leaner than chemically correct for combustion, introducing the mixture of compressed fuel and air into an elongated heating zone, introducing the heated fuel-air mixture into an elongated reaction zone which is in indirect heat exchange relationship with the heating zone over a substantial surface area, said fuel being oxidized in said reaction zone releasing energy and providing heat to the heating zone, withdrawing the hot products of oxidation to a turbine, passing the gases through the turbine blading to extract at least sufficient energy from the gases to operate the compressor and discharging the gases from the turbine.

2. The method of operating a turbine set including a compressor, turbine and at least one combustor which comprises spraying liquid fuel into the air prior to its introduction into the compressor in a ratio leaner than chemically correct for combustion, introducing the mixture of compressed fuel and air into an elongated heating zone, introducing the heated fuel-air mixture into an elongated reaction zone which is in indirect heat exchange relationship with the heating zone over a substantial surface area, controlling the velocity of the gases through the major portion of the heating and reaction zone at a substantially constant value, said fuel being oxidized in said reaction zone releasing energy and providing heat to the heating zone, withdrawing the hot products of oxidation to a turbine, passing the gases through the turbine blading to extract at least sufficient energy from the gases to operate the compressor and discharging the gases from the turbine.

3. The method of operating a turbine set including a compressor, turbine and at least one combustor which comprises spraying liquid fuel into the air prior to its introduction into the compressor in the ratio of about 1 part of fuel by weight to between about 30 parts of air by weight to about 50 parts of air by weight, introducing the mixture of compressed fuel and air into an elongated heating zone, introducing the heated fuel-air mixture into an elongated reaction zone which is in indirect heat exchange relationship with the heating zone over a substantial surface area, said fuel being oxidized in said reaction zone releasing energy and providing heat to the heating zone, withdrawing the hot products of oxidation to a turbine, passing the gases through the turbine blading to extract at least a portion of the energy of the hot gases and discharging the gases from the turbine.

4. The method of operating a turbine set including a compressor, turbine and at least one combustor which comprises spraying liquid fuel into the air prior to its introduction into the compressor in the ratio of about 1 part of fuel by weight to within about 30 parts of air by weight to about 50 parts of air by weight, introducing the mixture of compressed fuel and air into an elongated heating zone, introducing the heated fuel-air mixture into an elongated reaction zone which is in indirect heat exchange relationship with the heating zone over a substantial surface area, said fuel being oxidized in said reaction zone releasing energy and providing heat to the heating zone, withdrawing the hot products of oxidation to a turbine, passing the gases through the turbine blading to extract at least sufficient energy from the gases to operate the compressor and discharging the gases from the turbine.

5. The method of operating a turbine set including a compressor, turbine and at least one combustor which comprises spraying liquid fuel into the air prior to its introduction into the compressor in a ratio leaner than chemically correct for combustion, introducing a major portion of the compressed fuel and air into an elongated heating zone, introducing the remainder of the fuel-air mixture into an elongated reaction zone which is substantially in indirect heat exchange relationship with the heating zone, introducing fuel into said reaction zone to mix with the said remainder of the fuel-air mixture in an amount needed to bring the mixture proportions of the fuel-air mixture to substantially chemically correct proportion for combustion, burning the enriched mixture in the reaction zone, introducing the heated fuel-air mixture from the heating zone into the reaction zone at a multiplicity of locations substantially equally distributed throughout the boundary between the zones, withdrawing the hot products of oxidation from the reaction zone to the turbine, passing the gases through the turbine blading to extract at least sufficient energy from the gases to operate the compressor and discharging the gases from the turbine.

6. The method of operating a turbine set including a compressor, turbine, and at least one combustor which comprises spraying liquid fuel into the air prior to its introduction into the compressor in a ratio leaner than chemically correct for combustion, introducing the mixture of compressed fuel and air into an elongated heating zone, introducing the heated fuel-air mixture into an elongated reaction zone which is in indirect heat exchange relationship with the heating zone, said heating zone and reaction zone being formed by substantially concentric tubes, the region inside the inner tube defining the reaction zone and the annulus between the inner and outer tubes defining the heating zone, introduction of fuel-air mixture into the heating zone being made in a substantially tangential direction causing the gases to follow a spiral motion as they progress down the annulus between the tubes, directing the gases after their travel through the annular heating zone into the reaction zone, the gases travelling in a generally opposite direction through the reaction zone to the direction of travel through the heating zone, discharging the gases from the reaction zone to the turbine, passing the gases through the turbine blading and discharging the gases from the turbine.

LESTER C. LICHTY.

References Cited in the file of this patent

UNITED STATES PATENTS

| Number | Name | Date |
| --- | --- | --- |
| 1,052,588 | Janicki | Feb. 11, 1913 |
| 2,446,059 | Peterson et al. | July 27, 1948 |
| 2,477,683 | Birmann | Aug. 2, 1949 |
| 2,510,645 | McMahan | June 6, 1950 |
| 2,511,385 | Udale | June 13, 1950 |
| 2,515,542 | Yellott | July 18, 1950 |
| 2,525,206 | Clarke | Oct. 10, 1950 |
| 2,529,946 | Imbert | Nov. 14, 1950 |
| 2,530,019 | Mayers | Nov. 14, 1950 |
| 2,552,851 | Gist | May 15, 1951 |
| 2,602,289 | Anxionnaz et al. | July 8, 1952 |
| 2,621,477 | Powter et al. | Dec. 16, 1952 |
| 2,628,475 | Heath | Feb. 17, 1953 |

FOREIGN PATENTS

| Number | Country | Date |
| --- | --- | --- |
| 935,322 | France | Feb. 2, 1948 |
| 603,918 | Great Britain | June 25, 1948 |
| 626,174 | Great Britain | July 11, 1949 |

OTHER REFERENCES

Marks' Handbook; Fourth Edition; Sec. 4, Table 33, "Products of Combustion"; page 365.

Journal of Society of Automotive Engineers, vol. 12, January 1923; "Survey of Gasoline and Kerosene Carburetion"; page 69.